(12) United States Patent
Battagin et al.

(10) Patent No.: US 7,587,393 B2
(45) Date of Patent: Sep. 8, 2009

(54) LONG RUNNING REQUESTS

(75) Inventors: Daniel C. Battagin, Bellevue, WA (US);
Yariv Ben-Tovim, Bellevue, WA (US);
Shahar Prish, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 11/018,398

(22) Filed: Dec. 20, 2004

(65) Prior Publication Data

US 2006/0136386 A1 Jun. 22, 2006

(51) Int. Cl.
*G06F 17/30* (2006.01)

(52) U.S. Cl. .................. 707/4; 707/102; 707/1; 707/2; 707/3; 709/224; 709/227; 715/205; 715/234

(58) Field of Classification Search ............ 707/104.21, 707/1–4; 709/224, 227; 715/205, 234; 702/184
See application file for complete search history.

(56) References Cited

U.S. PATENT DOCUMENTS

| | | | | |
|---|---|---|---|---|
| 5,148,286 | A | * | 9/1992 | Knodt et al. |
| 5,467,449 | A | * | 11/1995 | Gauronski et al. |
| 6,041,330 | A | * | 3/2000 | Carman et al. |
| 6,101,510 | A | * | 8/2000 | Stone et al. ................. 715/234 |
| 6,243,091 | B1 | * | 6/2001 | Berstis |
| 6,546,133 | B1 | * | 4/2003 | Temkin et al. |
| 6,988,241 | B1 | * | 1/2006 | Guttman et al. ............. 715/503 |
| 7,404,188 | B2 | * | 7/2008 | Luty et al. |
| 7,448,068 | B2 | * | 11/2008 | Sun et al. |
| 7,461,119 | B2 | * | 12/2008 | Mukundan et al. |
| 2001/0001851 | A1 | * | 5/2001 | Piety et al. .................. 702/184 |
| 2003/0085818 | A1 | * | 5/2003 | Renton et al. |
| 2004/0078597 | A1 | * | 4/2004 | Sun et al. |
| 2004/0143496 | A1 | * | 7/2004 | Saenz .......................... 705/14 |
| 2004/0177148 | A1 | * | 9/2004 | Tsimelzon, Jr. ............. 709/227 |
| 2005/0027721 | A1 | * | 2/2005 | Saenz |
| 2005/0138634 | A1 | * | 6/2005 | Luty et al. |

\* cited by examiner

*Primary Examiner*—Don Wong
*Assistant Examiner*—Sheree N Brown
(74) *Attorney, Agent, or Firm*—Merchant & Gould, P.C.

(57) ABSTRACT

A progress UI is displayed within a user's web page for long-running requests. For each long-running request, a progress UI is displayed to the user indicating that the long-running request is being processed until the long-running request has been processed. The progress UI may be a progress indicator showing the user the status of the processing, or the status message could be some other message to the user indicating that the long-running request is still being processed. While the long-running request is being processed, data is sent from the server to the user's browser at a rate such that the server performing the long-running request does not time out. The current state of a web page may be maintained such that when a long running request is made the web page that contains the control that issued the long-running request is not automatically refreshed when the long running request takes place.

20 Claims, 7 Drawing Sheets

LONG RUNNING REQUESTS

BACKGROUND OF THE INVENTION

The Internet has seen expansive growth over the last several years. Today, more and more people are accessing the Internet to retrieve information and perform a variety of tasks. User can access a variety of different web sites to provide them with the information they desire. For example, some web sites may be configured to provide financial information, news information, sports information to the user, while other web sites may be configured to perform some type of calculation for the user. For example, a user may access a financial website and then use the web site to calculate how much money they should save to meet their retirement goals. Most of these requests are performed very quickly and the user receives a response from the web site in a short amount of time. Some requests, however, may take a long time to process. Too long of a delay may cause the web site to time out and not respond to the user's request or may cause the user to leave the web site if the response time is too slow.

SUMMARY OF THE INVENTION

Embodiments of the present invention are related to processing long-running requests.

According to one aspect of the invention, for each long-running request issued by a control, a progress UI is displayed to the user indicating that the long-running request is still being processed. The progress UI may be a progress indicator, or some other display indicating that the long-running request is still being processed. The progress UI may also include other controls with which the user may interact. For example, a cancel button may be provided to allow the user to cancel a long-running request. Once the long-running request has been processed, the progress UI is hidden and the results are shown to the user.

According to another aspect of the invention, data is sent from the server to the user's browser at a rate such that the server performing the long-running request or the browser does not timeout. The data that is sent by the server may be as simple as ones or zeroes, or the data may represent the progress of the long-running request.

According to yet another aspect of the invention, the current state of a page may be maintained, such that when a long running request is made, the web page that contains the control that issued the long-running request is not automatically refreshed during the time period the long running request takes place.

According to still yet another aspect of the invention, software does not need to be deployed to the client machine to display the progress UI for the long-running request.

DETAILED DESCRIPTION OF THE PREFERRED EMBODIMENT

Generally, embodiments of the present invention are related to handling long-running requests. For each long-running request, a progress UI is displayed to the user within a control on a web page indicating that the long-running request is being processed. The term "control" refers to an HTML construct. The progress UI may be a progress indicator showing the user the status of the processing, or the progress UI could be some other display to the user indicating that the long-running request is still being processed. Once the long-running request has been processed, the progress UI is hidden and the results relating to the long-running request are shown to the user. While the long-running request is being processed, data is sent from the server to the user's browser at a rate such that the connection between the server and user's browser remains active, and a timeout does not occur. The data sent may be as simple as a series of ones or zeroes, or the data may be an indication of the progress of the long-running request. When the data is an indication of the progress, then the user's control that made the long-running request may display the progress of the request to the user. The current state of a web page may be maintained such that when a long running request is made the web page that contains the control that issued the long-running request is not automatically refreshed during the long running request.

Illustrative Long-Running Request System

Figure 2:
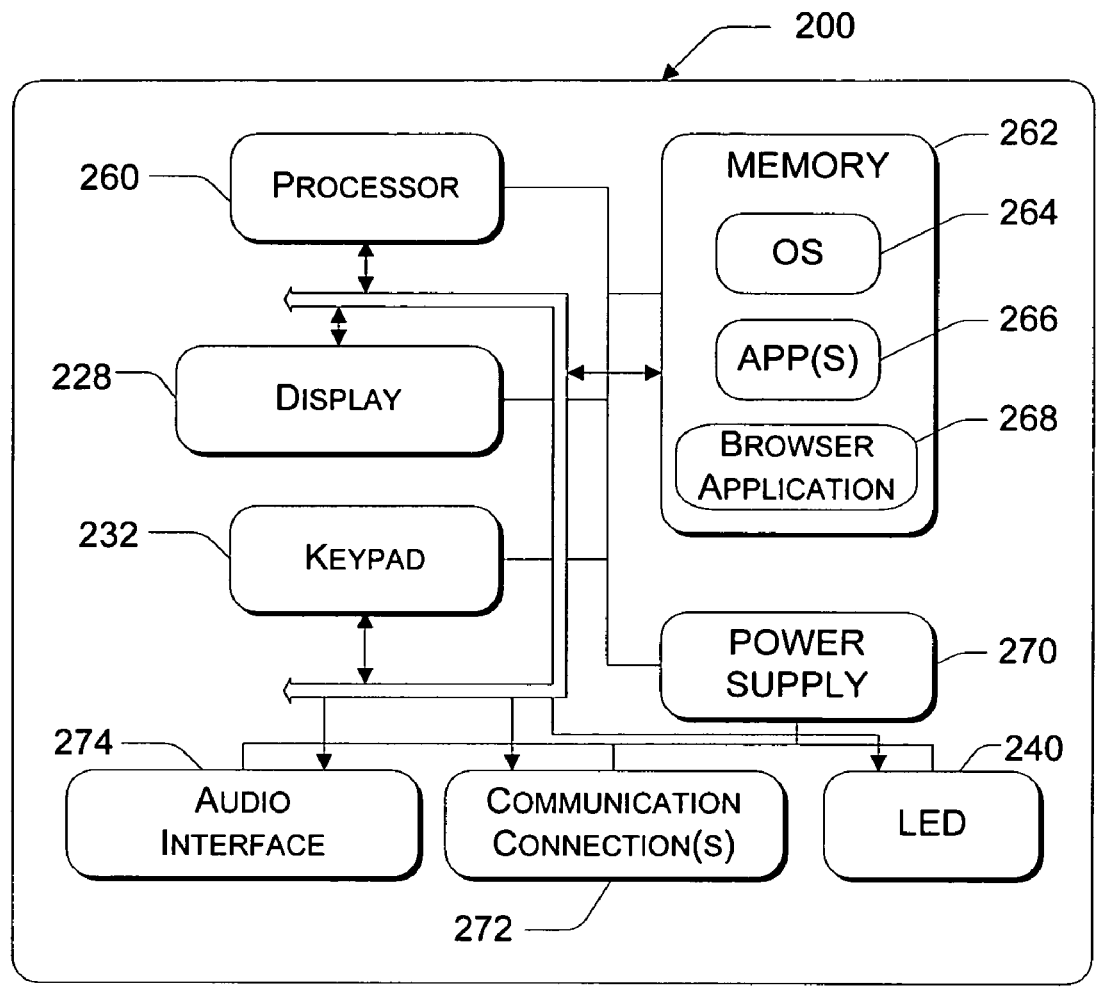
Figure 3:
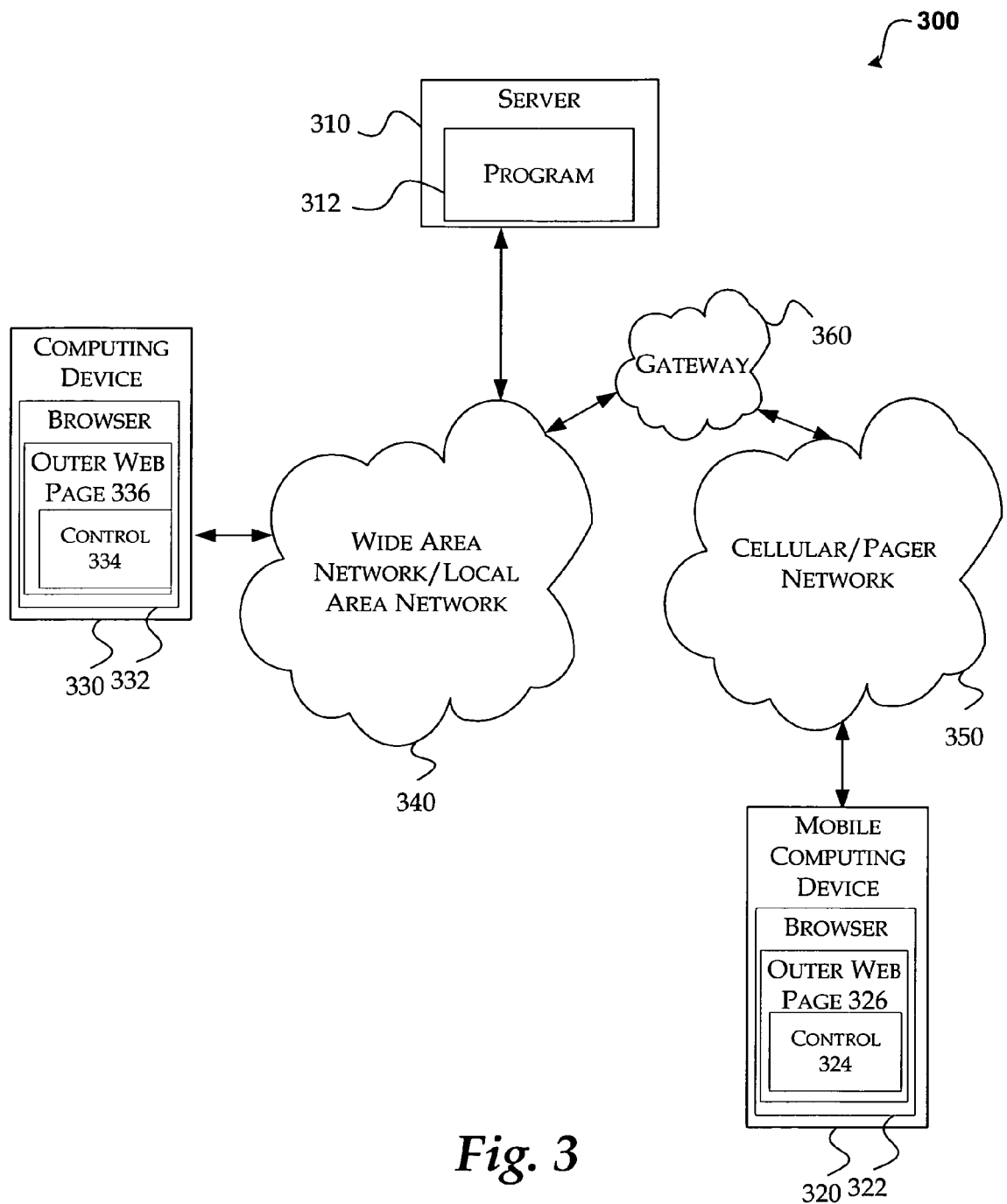
FIG. 3 illustrates a functional block diagram generally illustrating a long-running request system.

FIG. 3 is a functional block diagram generally illustrating a long-running request system 300, in accordance with aspects of the invention. Server 310 and computing device 330 are computing devices such as the one described in conjunction with FIG. 1 and mobile device 320 is a mobile computing device such as the one described above in conjunction with FIG. 2. Computing devices 320 and 330 may communicate with server 310 using any one of several client-server protocols.

Server 310 runs program 312. Program 312 may be any program that receives requests. Program 312 is configured to perform operations in response to a request from a control, such as control 324 and/or control 334. According to one embodiment of the invention, program 312 is configured to perform spreadsheet calculations in response to a request from a control.

Web servers may be programmed to automatically timeout a request that exceeds a predetermined period of time. For example, a web server may be configured to timeout somewhere between 30 seconds to 2 minutes. These timeout periods help to protect the web server from a denial of service attack. In order to help prevent a timeout from occurring, server 310 sends data to client 320 and/or 330 at a predetermined rate such that the server 310 does not timeout. Server 310 may also be configured to determine if the connection with a browser is still open. When the connection is closed, the long-running requests may be terminated.

Browsers 322 and 332 are configured to interact with program 312 that is running on server 310. Each browser includes an outer web page (326 and 336) that may include one or more controls, such as controls 324 and 334. According to one embodiment, controls 324 and 334 are inner frame controls, such as IFRAME controls, that are included within HTML web pages 326 and 336. The browsers residing on mobile device 320 and computing device 330 are configured to connect with server 310 and request at least a portion of the outer web page to be rendered. Controls 324 and 334 are configured to request server 310 to process a long-running request and render the contents of the control.

The request made by a control may or may not be considered a long-running request. According to one embodiment, any request submitted to server 310 that is going to exceed a predetermined amount of time to calculate the results is treated as a long-running request. The predetermined amount of time is configurable (e.g. 5 seconds). According to another embodiment of the invention, every request submitted by a control to server 310 is treated as a long-running request.

According to one embodiment of the invention, the long-running requests made by the controls are requests to process spreadsheet workbooks. When a workbook is opened by a user on a computing device (e.g. computing device 320 and/or 330), a workbook file is loaded into the memory of the computing device and data queries may be made on (remote) databases, and then server 310 performs the calculation of the formulas in that workbook. This processing is potentially expensive for many reasons. For example, the workbook files can be located on a remote server, the databases can be busy serving other queries run against them, and the server's CPU can be busy performing other calculations.

On any request to server 310 from a control (324, 334) that is determined to be a long-running request, server 310 causes the control that made the long-running request to render a progress UI until the calculation of the workbook is complete. According to one embodiment of the invention, the progress UI is a frame that displays an animated image and a message stating that the request is being processed. This may also include a link/button to cancel the request (See FIGS. 5 and 6).

Other long-running requests may be requested by the controls for server 310 to perform. For example, server 310 may be configured to perform stock calculations, finance calculations, and the like. Once program 312 has finished calculating the workbook and the results have been delivered to the requesting control, the results are displayed to the user and the progress UI is hidden.

Server 310 is configured to perform the following actions when handling a long-running requests. When the user interacts with the client Web browser (e.g. 326, 336), the Web browser notes the interaction, displays the progress UI, and then makes the request to server 310. The client Web browser may decide not to render the progress UI for some amount of time (configurable) if it determines that the request may not be a long-running request. Upon being rendered, the control makes a refresh request to server 310 to refresh its content. This second refresh request may be a long-running request. Upon receipt of the second request, program 312 begins performing the long-running request. Although only one server is shown for processing a long-running request, more than one server may be involved in performing the operations relating to the request.

In response to the long-running request, and so that a timeout does not occur, server 310 trickles some data periodically to the client. As an example of a timeout scenario, the first control's request on a web page could take 30 seconds to process, the second control's request could take 75 seconds. If the server has a timeout period of sixty (60) seconds configured then rendering the controls would cause a timeout to occur if the server was not configured to trickle data to the client.

The data sent by server 310 could be any set of data (e.g. ones or zeroes) or the data could represent the progress of the long-running request. For example, server 310 could send a number in a predetermined format that indicates the percentage that has been completed of the long-running request to the browser. The control could then use this number to display the percentage complete to the user.

The web pages (326 and 336) may include inline content and one ore more controls. The web pages also hold some scripts for performing various actions. For example, one script is included for displaying the HTML progress UI. Another script may be used for handling a button that may be included within the progress UI.

In order to display the progress UI there is no deployment of software to the client machine. In other words, the client receives the progress UI from server 310. According to one embodiment, a script is used to display the progress UI. A GET operation or a POST operation may be used to direct the control to display the appropriate content (e.g. the progress UI until the results have been received, and then the results). Another script is used to determine when the inner frame has completed loading the results of the long-running request and when the inner frame has completed loading, the script hides the progress UI and updates the contents of the control.

Long-running request system 300 is also directed at handling a refresh of the outer web page while a long-running request is being processed. A current state of the long-running request is stored in a cookie associated with the browser. This cookie is used by server 310 to determine what to include within the content that is sent back to the browser as a result of the refresh request.

Cellular/pager network 350 is a network responsible for delivering messages to and receiving messages from wireless devices. The cellular/pager network 350 may include both wireless and wired components. For example, cellular/pager network may include a cellular tower that is linked to a wired telephone network. Typically, the cellular tower carries communication to and from cell phones, long-distance communication links, and the like.

Gateway 360 routes messages between cellular/pager network 350 and WAN/LAN 340. For example, a computer user may send a message that is addressed to a cellular phone. Gateway 360 provides a means for transporting the message from the WAN/LAN 340 to cellular/pager network 350. Conversely, a user with a device connected to a cellular network may be browsing the Web. Gateway 360 allows hyperlink text protocol (HTTP) messages to be transferred between WAN/LAN 340 and cellular/pager network 350.

Figure 4:
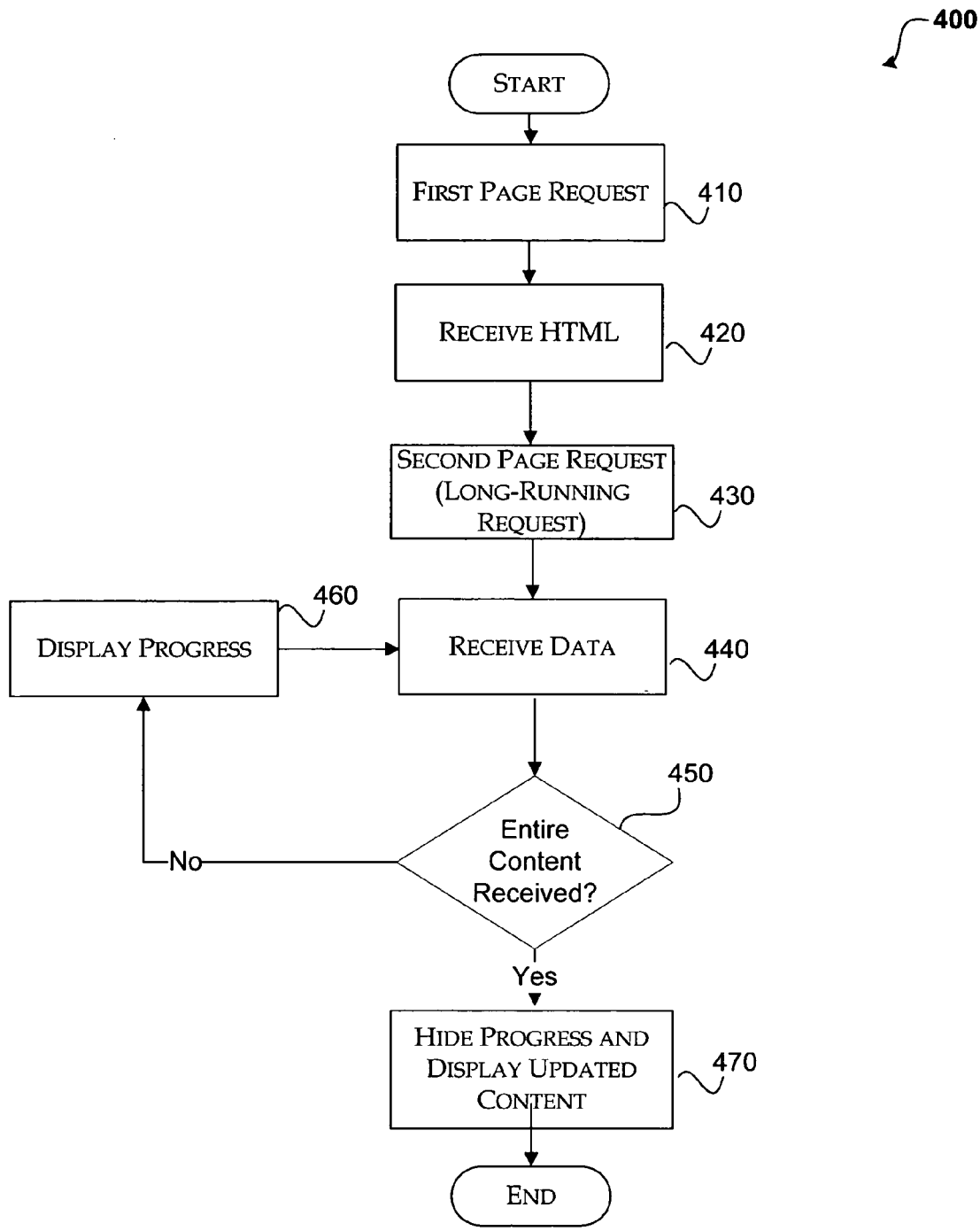
FIG. 4 shows a process for a long-running request.

FIG. 4 illustrates a process flow for a long-running request, in accordance with aspects of the invention. After a start block the process flows to block 410, where a first page request is made from the client to the server. The first page request includes at least one control within the outer web page.

Moving to block 420, HTML is received in response to the initial page request. The HTML may include inline content as well as information relating to the controls that are within the outer web page. The received HTML is rendered on the client machine.

Transitioning to block 430, a second page request is made by the client. The second page request is a long-running request that is made by a control that is within the outer web page.

Flowing to block 440, data is received from the server. The data may be used to display the progress of the long-running request. The data is provided to the client at such a rate as to avoid a timeout from occurring.

Moving to decision block 450, a determination is made as to whether the entire content has been received in response to the long-running request. When the entire content has not been received the process flows to block 460. At block 460, a progress UI is displayed to the user within the control. The process then moves to block 440.

When the entire content has been received (i.e. the long-running request has completed), the process moves to block 470 where the progress UI is hidden and the received content that relates to the long-running request is displayed to the user.

The process then moves to an end block and returns to processing other actions.

Figure 5:
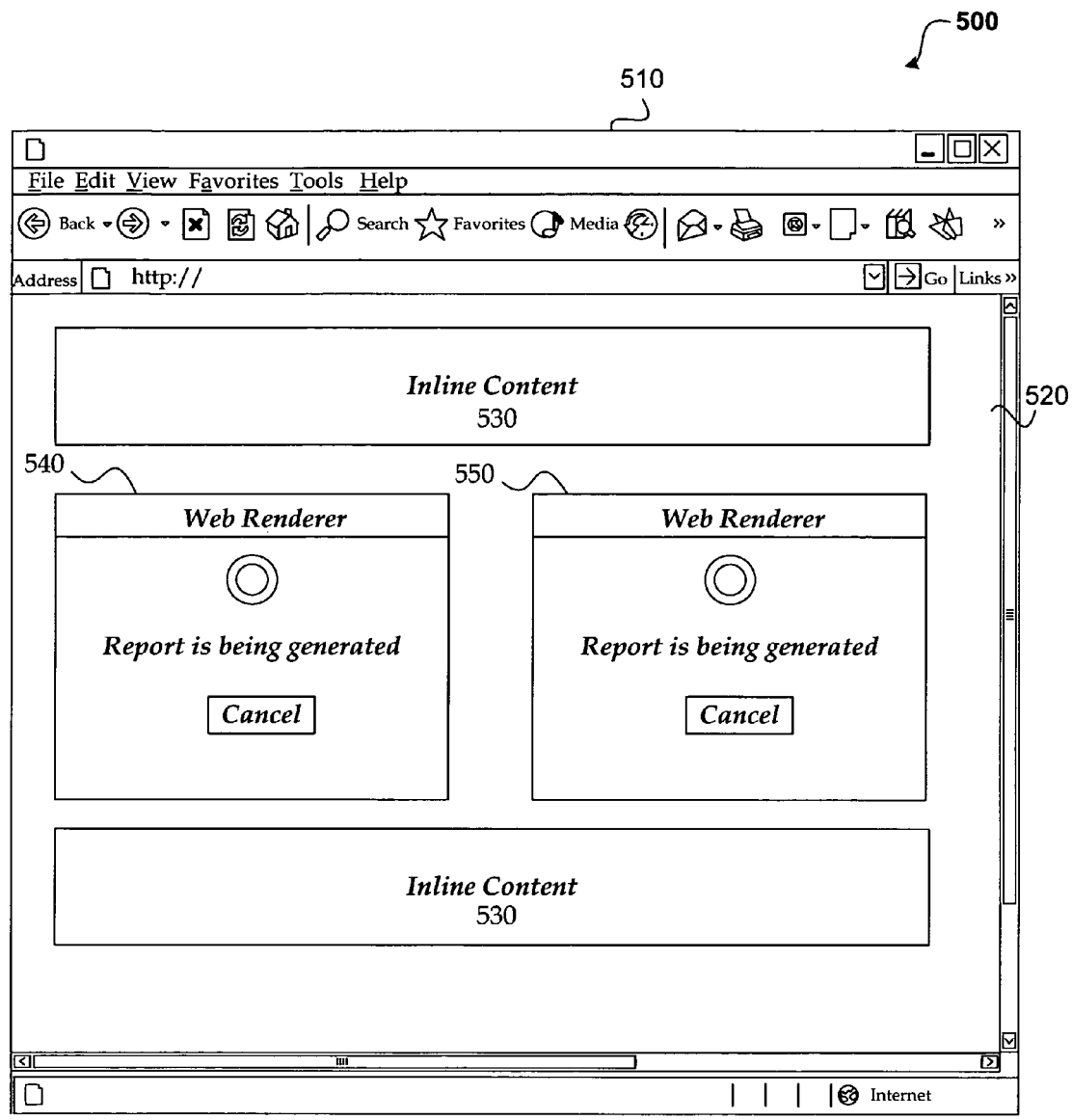
FIG. 5 illustrates a browser including two controls that have each made a long-running request.

FIG. 5 illustrates a browser including two controls that have each made a long-running request; in accordance with aspects of the invention.

As illustrated, display 500 includes browser 510 that includes an outer web page that includes inline content 530, control 540 and control 550. Control 540 and control 550 are shown when they have not received the results of the long-running request. Each of the controls (540 and 550) show that a report is being generated but has not yet completed. According to one embodiment, the user may select the cancel button to cancel the long-running request.

Figure 6:
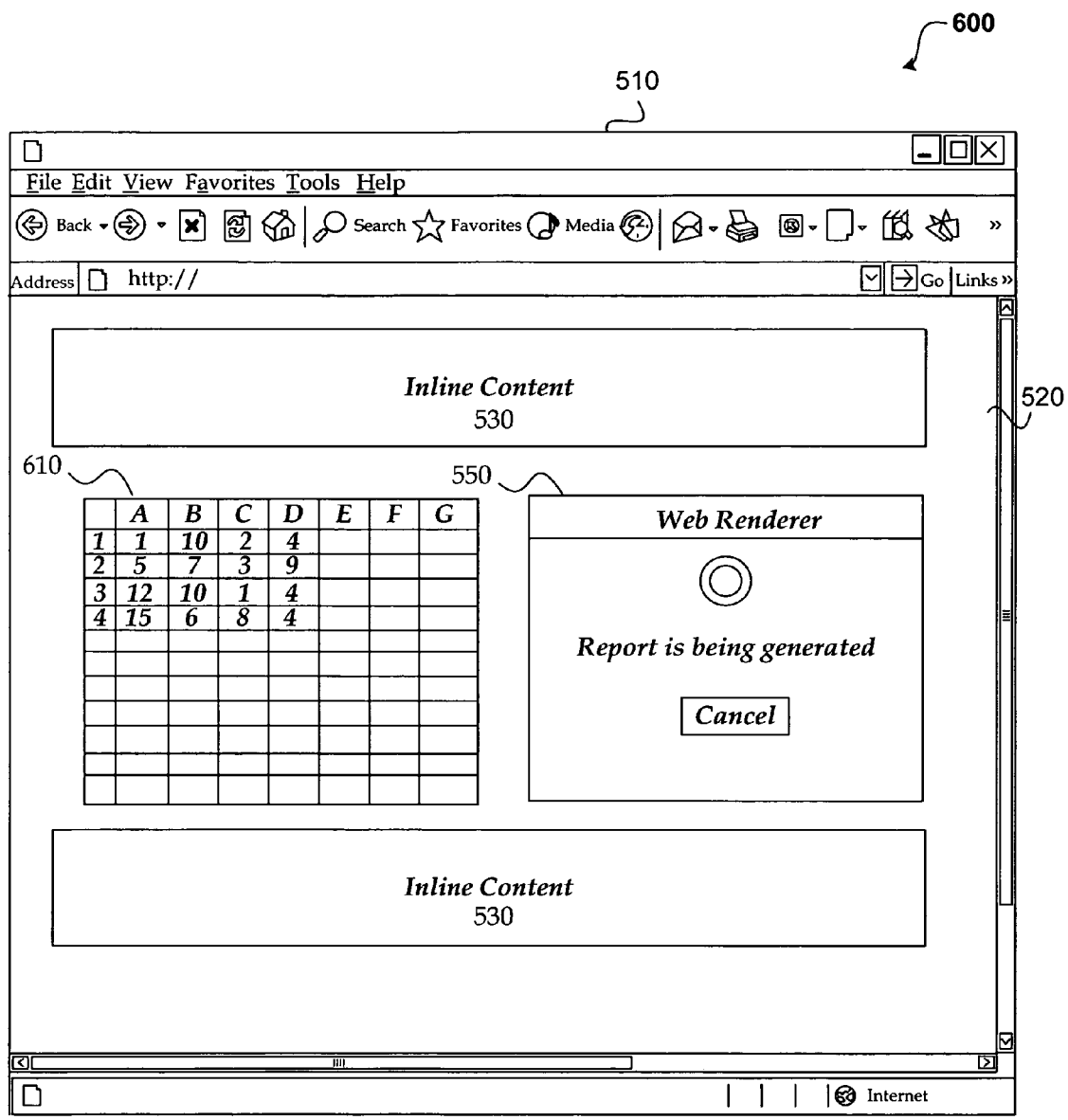
FIG. 6 shows a browser including a control that has received the results of a long-running request and a control that has not received the results of a long-running request.

FIG. 6 shows a browser including a control that has received the results of a long-running request and a control that has not received the results of a long-running request; in accordance with aspects of the invention.

As shown, browser 510 includes control 610 that has received the results from the long-running request. Once the results have been received the progress UI that was displayed in the control (See FIG. 5) is replaced with the results from the long-running request. Referring to control 550 it can be seen that control 550's long-running request is still processing.

Figure 7:
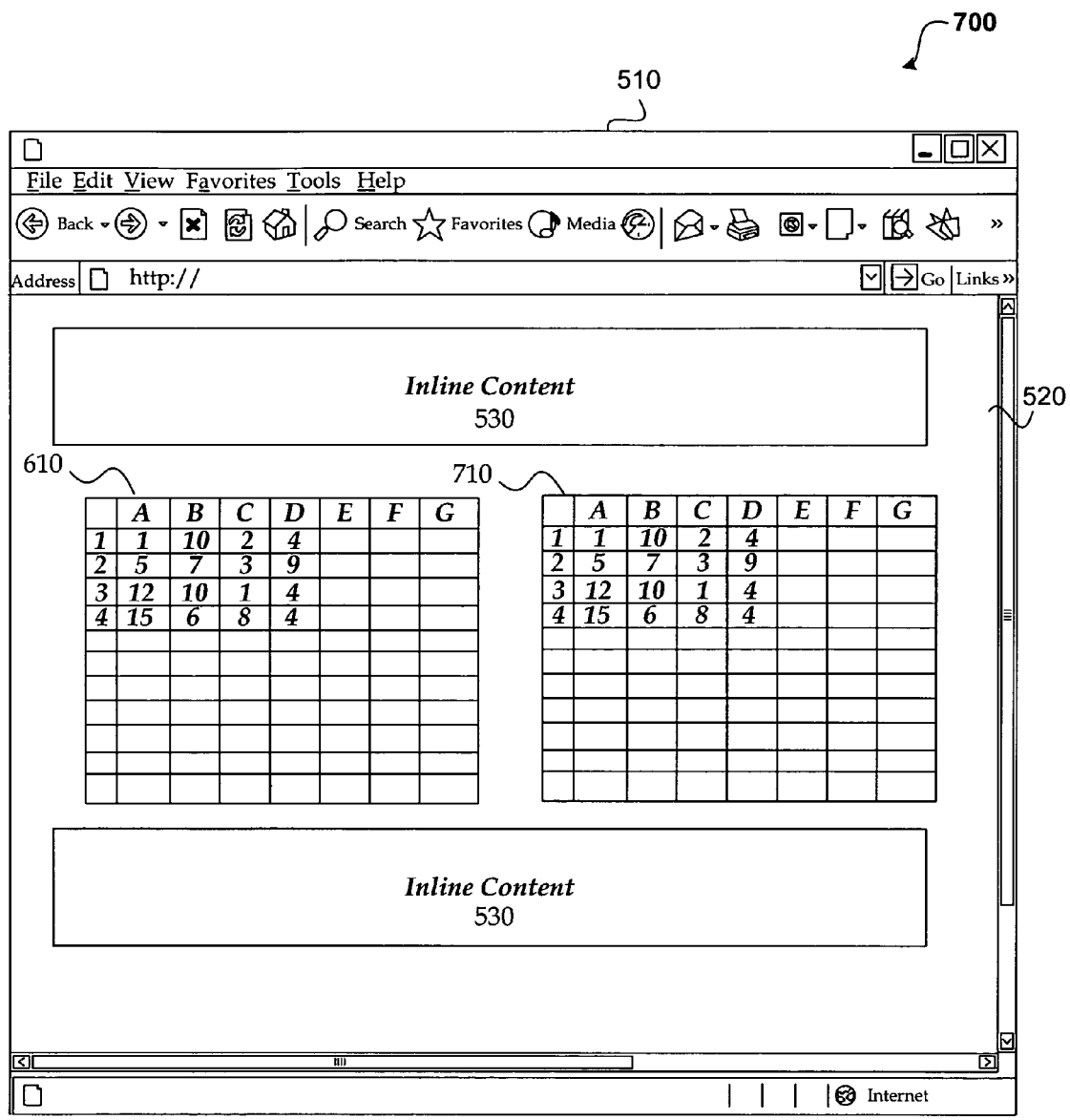
FIG. 7 illustrates a browser including two controls that have received the results from long-running request; in accordance with aspects of the invention.

FIG. 7 illustrates a browser including two controls that have received the results from long-running request; in accordance with aspects of the invention. As illustrated, browser 510 includes two controls (610 and 710) showing the results from the long-running request.

Illustrative Operating Environment

Figure 1:
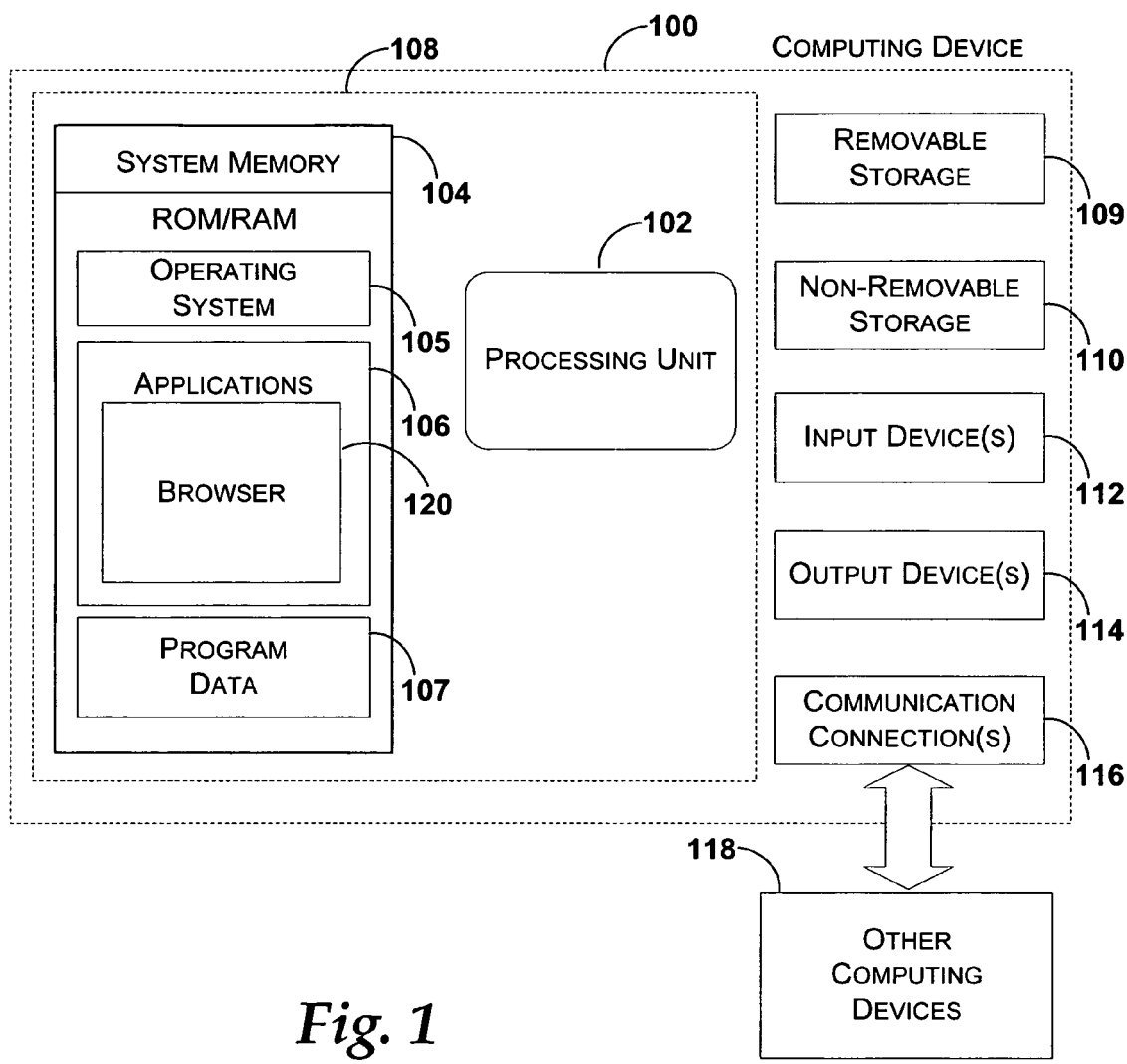
FIGS. 1 and 2 illustrate an exemplary computing devices that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. In one embodiment, application 106 may include a browser application 120. In another embodiment, application 106 may be any application that receives a long-running request when computing device 100 is configured as a server. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

FIG. 2 illustrates a mobile computing device that may be used in one exemplary embodiment of the present invention. With reference to FIG. 2, one exemplary system for implementing the invention includes a mobile computing device, such as mobile computing device 200. Mobile computing device 200 includes processor 260, memory 262, display 228, and keypad 232. Memory 262 generally includes both volatile memory (e.g., RAM) and non-volatile memory (e.g., ROM, Flash Memory, or the like). Mobile computing device 200 includes operating system 264, such as the Windows CE operating system from Microsoft Corporation, or another operating system, which is resident in memory 262 and executes on processor 260. Keypad 232 may be a push button numeric dialing pad (such as on a typical telephone), a multi-key keyboard (such as a conventional keyboard). Display 228 may be a liquid crystal display, or any other type of display commonly used in mobile computing devices. Display 228 may be touch-sensitive, and would then also act as an input device.

One or more application programs 266 are loaded into memory 262 and run on the operating system 264. Browser application 268 resides on mobile computing device 200 and is programmed to include an outer web page and controls that may make long-running requests. Mobile computing device 200 also includes non-volatile storage 268 within memory 262. Non-volatile storage 268 may be used to store persistent information which should not be lost if mobile computing device 200 is powered down.

Mobile computing device 200 includes power supply 270, which may be implemented as one or more batteries. Power supply 270 might further include an external power source, such as an AC adapter or a powered docking cradle that supplements or recharges the batteries.

Mobile computing device 200 is shown with two types of optional external notification mechanisms: LED 240 and audio interface 274. These devices may be directly coupled to power supply 270 so that when activated, they remain on for a duration dictated by the notification mechanism even though processor 260 and other components might shut down to conserve battery power. Audio interface 274 is used to provide audible signals to and receive audible signals from the user. For example, audio interface 274 may be coupled to a speaker for providing audible output and to a microphone for receiving audible input, such as to facilitate a telephone conversation.

Mobile computing device 200 also includes communications connection(s), such as a wireless interface layer, that performs the function of transmitting and receiving communications. Communications connection 272 facilitates wireless connectivity between the mobile computing device 200 and the outside world. According to one embodiment, transmissions to and from communications connection 272 are conducted under control of the operating system 264.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for processing long-running requests, comprising:
    sending from a client a first page request to a server to render an HTML page within a browser on the client; wherein the HTML page includes at least one control;
    receiving from the server HTML from the first page result;
    rendering the HTML within the browser;
    generating a second page request; wherein the second page request instructs the server to treat the second page request as a long-running request that requests the control to be rendered within the browser; wherein the long-running request is a request to the server that indicates that the request when processed by the server exceeds a server timeout period for servicing the long-running request and in response to the long-running request the server sending data to the client at a rate that avoids triggering the server timeout period during processing of the long-running request; wherein the data sent by the server to the client is any type of data;
    receiving at the client the data sent from the server at a rate that avoids a timeout on the server;
    initiating the display of a progress UI within the control in response to generating the long-running request and the receiving data from the server such that the progress UI is displayed while the long-running request is being executed while maintaining the state of the HTML page, wherein the progress UI indicates the status of a long-running request while it is being executed; and
    hiding the progress UI in response to a determination that the long running request is complete.

2. The method of claim 1, wherein the received data indicates a progress of completing the long-running request.

3. The method of claim 1, further comprising maintaining a state associated with the long-running request, wherein the state is used during a refresh request.

4. The method of claim 1, wherein the control is an IFRAME control.

5. The method of claim 2, wherein displaying the progress UI comprises displaying the progress of the long-running request using the received data.

6. The method of claim 2, further comprising hiding the progress UI when the long-running request is completed and displaying the results of the long-running request within the control.

7. The method of claim 6, further comprising maintaining a state associated with the long-running request.

8. The method of claim 7, wherein the state is used in determining the HTML to include in the response.

9. A computer-readable storage medium having computer-executable instructions for processing long-running requests, the instructions comprising:
    sending a first page request to a server; wherein a first page includes at least one control;
    rendering the first page in response to a result received in response to the first request;
    sending a second page request; wherein the second page request instructs the server to treat the second page request as a long-running request that requests the control to be rendered; wherein the long-running request is a request to the server that indicates that the servicing of the long-running request will exceed a timeout period of the server and in response to the long-running request the server sending data to the client at a rate that avoids triggering the server timeout period; wherein the data sent by the server to the client is any type of data;
    displaying a progress UI within the control that indicates the status of a long-running request is being executed while the long-running request is being executed; wherein the progress UI is displayed using HTML and wherein the first page is maintained while the long-running request is being processed;
    determining whether the long running request is currently being processed by determining whether the entire content has been received;
    continuing to display the progress UI in response to determining that the long running request is currently being processed; and
    hiding the progress UI in response to determining that the long running request in not currently being processed such that the progress UI is hidden when the long running request is complete.

10. The computer-readable medium of claim 9, wherein the data is sent during processing of the long-running request.

11. The computer-readable medium of claim 10, wherein the received data represents a progress of completion relating to the long-running request.

12. The computer-readable medium of claim 10, further comprising maintaining a state associated with the long-running request, wherein the state is used during a refresh request such that the long-running request associated with the control continues to be processed.

13. The computer-readable medium of claim 10, wherein the control is an IFRAME control.

14. The computer-readable medium of claim 10, further comprising hiding the progress UI when the long-running request is completed and displaying the results of the long-running request within the control.

15. The computer-readable medium of claim 14, further comprising maintaining a state associated with the long-running request.

16. A system for processing long-running requests, comprising:
    a server comprising:
        a processor and a computer-readable medium;
        an operating environment stored on the computer-readable storage medium and executing on the processor; and
        a program operating under the control of the operating environment and operative to perform actions, including:
            receiving a first page request from a client that includes a control within an HTML page associated with the first page request;

sending HTML in response to the first page request;
receiving a second page request from the control; wherein the second page request is treated as a long-running request; wherein the long-running request causes the server to stream data to the client at a rate that avoids a timeout from being detected; wherein the data may be any type of data;
performing operations relating to the long-running request; and
providing a result of long-running request to the client;
the client that is coupled to the server, comprising:
a processor and a computer-readable medium;
an operating environment stored on the computer-readable medium and executing on the processor;
a display; and
a browser operating under the control of the operating environment and operative to perform actions, including:
sending the first page request to the server;
rendering a first page in response to the received HTML;
sending the second page request;
initiating the display of a progress UI within the control that indicates that a long-running request is being executed while the long-running request is being executed and while maintaining a state of the first page; wherein the progress UI is displayed using HTML; and wherein the progress UI indicates the status of a long-running request while it is being executed; and
hiding the progress UI in response to a determination that the long running request is complete.

17. The system of claim 16, wherein the streamed data represents a progress of completion relating to the long-running request.

18. The system of claim 17, wherein the progress UI displays the progress of the long-running request.

19. The system of claim 17, further comprising the client maintaining a state associated with the long-running request, wherein the state is used during a refresh request such that the long-running request associated with the control continues to be processed.

20. The system of claim 17, further comprising the browser hiding the progress UI when the long-running request is completed and displaying the results of the long-running request within the control.

* * * * *